US007536250B2

(12) United States Patent
Eisenkölbl et al.

(10) Patent No.: US 7,536,250 B2
(45) Date of Patent: May 19, 2009

(54) DEVICE FOR DETERMINING THE POSITION OF AN INTERNAL COMBUSTION ENGINE

(75) Inventors: Markus Eisenkölbl, Höhenkirchen (DE); Willem Johan Anton Teulings, Fontenilles (FR); Frédéric Galtier, Montpellier (FR)

(73) Assignees: Continental Automotive France, Toulouse (FR); Bayerische Motoren Werke AG, Munich (DE)

( * ) Notice: Subject to any disclaimer, the term of this patent is extended or adjusted under 35 U.S.C. 154(b) by 245 days.

(21) Appl. No.: 10/586,645

(22) PCT Filed: Jan. 7, 2005

(86) PCT No.: PCT/FR2005/000041

§ 371 (c)(1),
(2), (4) Date: Aug. 28, 2006

(87) PCT Pub. No.: WO2005/080777

PCT Pub. Date: Sep. 1, 2005

(65) Prior Publication Data

US 2008/0228371 A1 Sep. 18, 2008

(30) Foreign Application Priority Data

Jan. 23, 2004 (FR) .................................. 04 00654

(51) Int. Cl.
*B60T 7/12* (2006.01)
*F02M 51/00* (2006.01)

(52) U.S. Cl. ...................................... 701/103; 123/476

(58) Field of Classification Search ................. 123/476, 123/617; 701/103, 115
See application file for complete search history.

(56) References Cited

U.S. PATENT DOCUMENTS

| | | | | | |
|---|---|---|---|---|---|
| 4,081,995 | A | * | 4/1978 | Griffith et al. | 73/114.63 |
| 4,357,662 | A | * | 11/1982 | Schira et al. | 701/111 |
| 4,691,288 | A | * | 9/1987 | Kay et al. | 702/41 |
| 4,697,561 | A | * | 10/1987 | Citron | 123/339.14 |
| 4,700,305 | A | * | 10/1987 | Lotterbach et al. | 701/101 |
| 4,931,940 | A | * | 6/1990 | Ogawa et al. | 701/101 |
| 7,184,876 | B2 | * | 2/2007 | Teulings et al. | 701/103 |
| 2005/0283300 | A1 | * | 12/2005 | Teulings et al. | 701/101 |

FOREIGN PATENT DOCUMENTS

DE 4230616 3/1994

(Continued)

*Primary Examiner*—John T Kwon
(74) *Attorney, Agent, or Firm*—Young & Thompson

(57) ABSTRACT

A device (1) for determining the position of an internal combustion engine, includes an incremental-type sensor (2) having a rotary part (8) which is connected to the rotary body, and a fixed part (6) which is provided with first elements for detecting the rotation of an increment between the mobile part (8) and the fixed part (6), second elements for detecting the direction of rotation between the mobile part (8) and the fixed part (6), and analysis elements which are connected to the first elements and the second elements and are used to determine the angular position of the rotary body in relation to the reference position. The device also includes engine controlling elements (4) which are connected to the analysis elements (12) of the sensor (2), and the sensor (2) is permanently electrically (34) fed in the device.

17 Claims, 3 Drawing Sheets

FOREIGN PATENT DOCUMENTS

| | | |
|---|---|---|
| DE | 19722016 | 12/1998 |
| EP | 0726448 | 8/1996 |
| EP | 1344919 | 9/2003 |
| FR | 2720444 | 12/1995 |
| FR | 2841296 | 12/2003 |

* cited by examiner

DEVICE FOR DETERMINING THE POSITION OF AN INTERNAL COMBUSTION ENGINE

FIELD OF THE INVENTION

The invention relates to a device for determining the position of an internal combustion engine comprising a rotary member.

More precisely, the invention aims to improve the starting of multi-cylinder internal combustion engines in order to reduce the starting time of such engines, and even allow the engine to be started directly without a starter, as a result of better knowledge of the position of each piston in order to select the cylinders to be supplied with fuel.

DESCRIPTION OF THE RELATED ART

In multi-cylinder internal combustion engines whose injection and ignition are regulated electronically, engine control means calculate the amount of fuel to be injected, the time at which it must be injected into each cylinder, and the time at which ignition must be effected. In order to do this, the position of the engine must be determined accurately.

EP-A-0 017 933 describes a device comprising incremental-type contactless sensors which are mounted on a crankshaft and on a camshaft of an internal combustion engine. The sensors each comprise a plate whose surface exhibits regularly disposed marks (offset angularly by an increment) and reference marks. Probes detect the passage of the successive marks relating to a rotation of the crankshaft and of the camshaft by one increment, and the passage of the reference marks. However, after the engine has been switched off, the position of the engine is no longer known, so that it is necessary to carry out a synchronisation procedure which comprises at least one rotation of the engine crankshaft.

Moreover, devices are known which comprise a contactless sensor of the absolute type. Such a device allows the position of the rotary member to be known at any time every 360°, without the need to run the engine, in so far as the signals emitted by the probes are a direct function of the position of the engine. DE-A-197 22 016 describes a device which comprises a sensor of that type comprising a Hall-effect probe and a probe of the magneto-resistive type which are arranged at the end of the camshaft and are subjected to a magnetic field which rotates with the camshaft.

However, a device of that type does not allow the position of the crankshaft to be known accurately in so far as on the one hand there is a degree of a play in the mechanism connecting the camshaft and the crankshaft and on the other hand the camshaft and the crankshaft can be offset angularly relative to one another in the case of engines equipped with a device for varying the opening time and amplitude of the valves.

SUMMARY OF THE INVENTION

The object of the invention is, therefore, to propose a device which is of moderate cost and solves the above-mentioned problems and which, in particular, allows the position of the crankshaft to be known accurately at any time, including after prolonged stoppage of the engine. To that end, according to the invention, the device comprises:

- an incremental-type sensor comprising a rotary part connected to the rotary member and a fixed part comprising:
  - first means for detecting a reference position of the rotary member and detecting the relative rotation of the movable part and the fixed part by an increment, said first means generating a first signal,
  - second means for detecting the relative direction of rotation of the movable part and the fixed part, generating a second signal,
  - analysis means connected to the first means and to the second means, for determining the angular position of the rotary member relative to the reference position, on the basis of the first signal and the second signal, and generating a third signal as a function of said angular position of the rotary member,
- engine control means connected to the analysis means of the sensor, said engine control means having a rest state in which they are not supplied with power and a live operating state during which they generate actions on operating members of the engine, such as fuel injectors or spark plugs, as a function of the third signal, in which device the sensor is supplied with power permanently, including when the control means are in the rest state.

An incremental-type device can more easily be fitted to the crankshaft than a device of the absolute type, which can only be positioned at the end of the crankshaft. By keeping the analysis means of the sensor supplied with power independently of the engine control means, the change in the position of the engine continues to be followed permanently, including when the fuel supply to the engine has been stopped, without consuming excessive amounts of electrical energy.

In order to reduce still further the consumption of electrical energy between two operating periods of the engine, in accordance with an advantageous feature of the invention the sensor has:

- an economic operating mode which comprises, in succession and at regular intervals, a phase of activity during which the first means and the second means are supplied with power, and a phase of inactivity during which the first means and the second means are not supplied with power, and
- a normal operating mode, during which the first means and the second means are supplied with power continuously.

The rotation of the engine is supposed to be reduced when the sensor is in economic operating mode as compared with when the sensor is in normal operating mode, the engine control means additionally advantageously not being supplied with power when the sensor is in economic operating mode. The first means and the second means can consequently operate intermittently in order to consume less electricity, but without missing any displacement of the engine.

Preferably, when the sensor is in economic operating mode, he duration of the phases of inactivity is at least 10 times longer than the duration of the phases of activity, and the duration of a phase of activity added to that of a consecutive phase of inactivity is less than 1 second.

Advantageously, the analysis means do not generate the third signal until they have received a fourth signal emitted by the engine control means.

In that manner, the work of the analysis means and their power consumption are reduced to a minimum.

In addition, the analysis means transmit to the engine control means a signal corresponding to the first signal.

In that manner, the engine control means are able to know the displacement of the engine relative to the position transmitted by the third signal and thus deduce therefrom the position of the engine in real time.

According to an advantageous embodiment in accordance with the invention, the device has the following features:

- the first signal comprises at least two levels, the sensor further comprises a counter which is increased or decreased by an increment at each change in level of the first signal according to the direction of rotation detected by the second means, and the counter is reset to zero after detection by the first means of the reference position of the rotary member.

That solution is simple, reliable and inexpensive.

Advantageously, in addition, the internal combustion engine comprises a crankshaft, the rotary member is constituted by the crankshaft of the engine, the counter is reset to zero only one time out of two after detection by the first means of the reference position of the rotary member.

Accordingly, the position of the crankshaft is known every 720°, and consequently the position of the engine is known perfectly.

According to an alternative that is likewise in accordance with the invention, although less advantageous a priori, the device has the following features:

the internal combustion engine comprises a crankshaft and a camshaft, the rotary member is constituted by the crankshaft of the engine, the device further comprises an angular position sensor which is located on the camshaft and generates a binary signal.

Accordingly, by combining the position of the crankshaft every 360° as determined by the incremental-type sensor and the binary signal generated by the angular position sensor mounted on the camshaft, the position of the engine can be known every 720° of the crankshaft.

BRIEF DESCRIPTION OF THE SEVERAL VIEWS OF THE DRAWINGS

The invention will become more apparent from the following description, which makes reference to the accompanying drawings, in which.

DETAILED DESCRIPTION OF THE PREFERRED EMBODIMENTS

Figure 1:
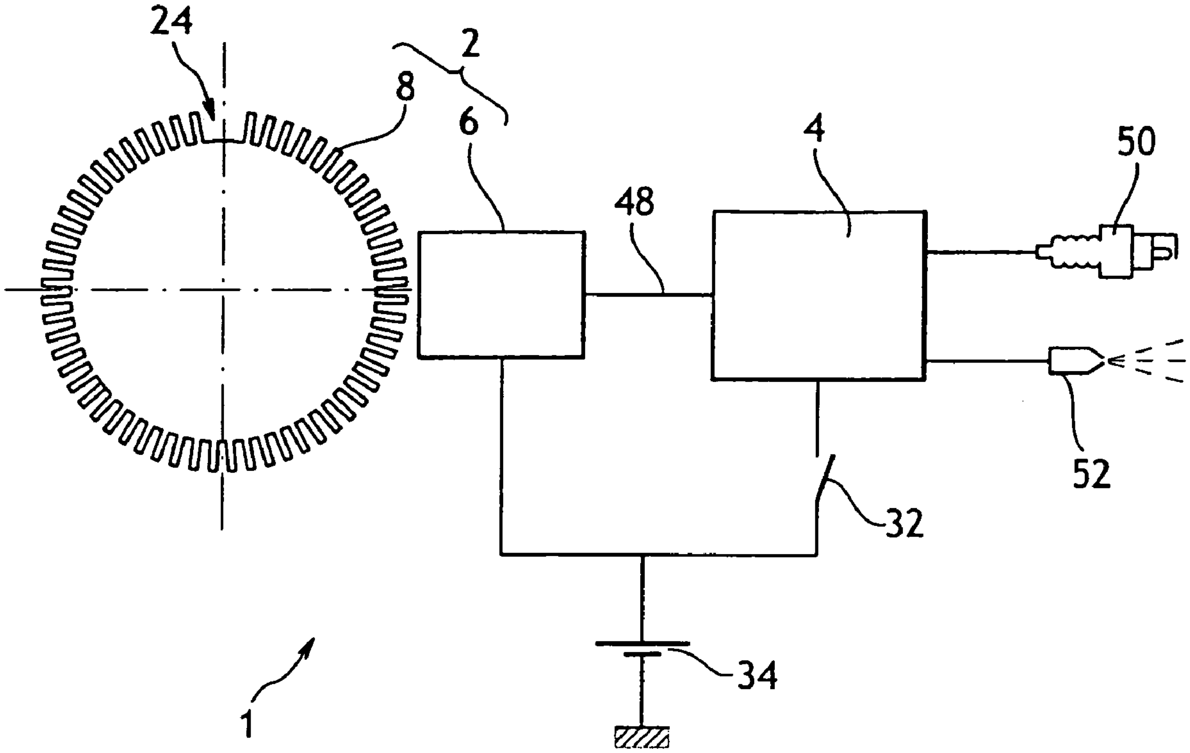
FIG. 1 is a diagrammatic representation of a device according to the invention, comprising especially a sensor and an engine control unit.

FIG. 1 shows a device 1 which essentially comprises a sensor 2 and an engine control unit 4. The sensor 2 is connected to the engine control unit 4 by a single wire 48. The engine control unit 4 is connected to operating members of the engine, such as the spark plugs 50 and the injectors 52.

Figure 2:
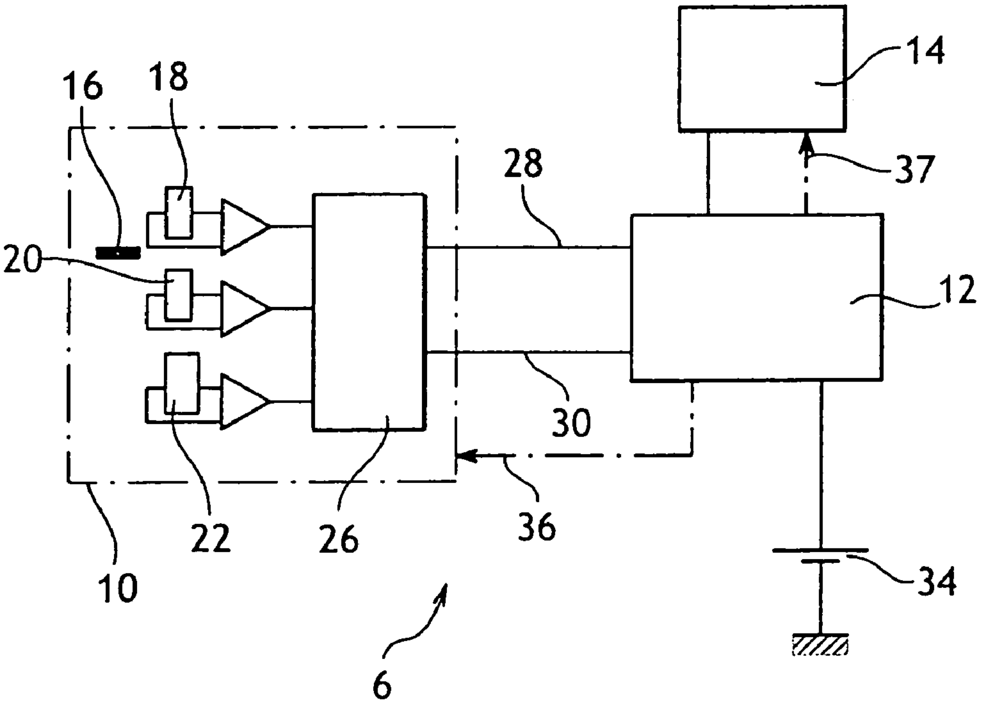
FIG. 2 is a detailed view of the fixed part of the sensor belonging to the device shown in FIG. 1.

The sensor 2 comprises a rotary part 8, which is integral with an engine crankshaft, and a fixed part 6 which is to detect displacements of the rotary part 8 and is shown in greater detail in FIG. 2. The rotary part is constituted by a plate 8 formed by a succession of 60 teeth and 60 spaces distributed uniformly, so that the teeth (and the spaces) are arranged on the periphery of the plate every 6 degrees, which corresponds to one displacement increment of the crankshaft. Two teeth have in fact been removed from the plate 8 in order to mark a reference position 24 of the crankshaft.

The fixed part 6 comprises an assembly 10 for detecting the displacement of the rotary part 8, an analysis unit 12 and a memory 14. The analysis unit 12 combines analogue signal processing means, a microprocessor, an analysis programme, an internal counter and a clock.

The assembly 10 for detecting the displacement of the rotary part 8 comprises a magnet 16, three probes 18, 20, 22 and a signal processing circuit 26. The magnet 16 generates a magnetic field, which is modified by the presence of the teeth of the plate 8, so that the voltage detected by the probes 18, 20, 22, which are here of the Hall-effect type, is a function of the presence or absence of a tooth opposite the probe. The probes 18 and 20 are offset by a distance less than the width of one tooth. The voltages emitted by the probes 18 and 20 are input into a first part of the signal processing circuit 26, which transmits to the analysis unit 12 a first signal 28 which has a first value when the probes 18, 20 are opposite a tooth and a second value when the probes 18, 20 are opposite a space.

The analogue signal processing means, the microprocessor and the analysis programme of the analysis unit 12 process the signal 28 and detect the passage of the signal 28 from the first value to the second value, which corresponds to a rotation of the crankshaft by one increment. Furthermore, processing of the first signal 28 by the analysis unit 12 allows the reference position 24 to be detected.

The probe 22 is offset relative to the probe 20 by a distance less than the width of one tooth. The voltages emitted by the probes 20 and 22 are input into a second part of the signal processing circuit 26, which transmits to the analysis unit 12 a second signal 30 which has a first value when the probes 20, 22 are opposite a tooth and a second value when the probes 20, 22 are opposite a space. The analysis programme and the processor of the analysis unit 12 process the signals 28, 30 and determine the direction of rotation of the crankshaft.

As a function of the determined direction of rotation, the analysis unit 12 increases or decreases the internal counter by an increment in accordance with the displacement of the crankshaft by an increment. When the internal counter reaches a value that corresponds substantially to two turns of the crankshaft, the internal counter is reset to a given initial value (advantageously zero) when the reference position 24 is detected. In that manner, if an error occurs during counting, it is corrected by the detection of the reference position 24 and does not affect the following counting operation.

As shown in FIG. 1, the power supply to the engine control unit 4 is cut off when the user of the vehicle on which the device is mounted breaks the contact 32; the sensor 2, on the other hand, is permanently supplied with power from the vehicle battery 34. More precisely, the analysis unit 12 is permanently supplied with power by the vehicle battery and manages the power supply 36, 37 of the assembly 10 for detecting the displacement of the rotary part 8 and of the memory 14.

When the engine is running, the engine control unit 4 is supplied with power, as are the assembly 10 for detecting the displacement of the rotary part 8 and the memory 14. By contrast, when the engine control unit 4 is no longer being supplied with power, the engine stops and, after a given period of time during which no rotation of the engine is detected on the basis of the signal 28, the analysis unit 12 stores the value of the internal counter in the memory 14 and then puts the sensor in economic operating mode 38.

Figure 3:
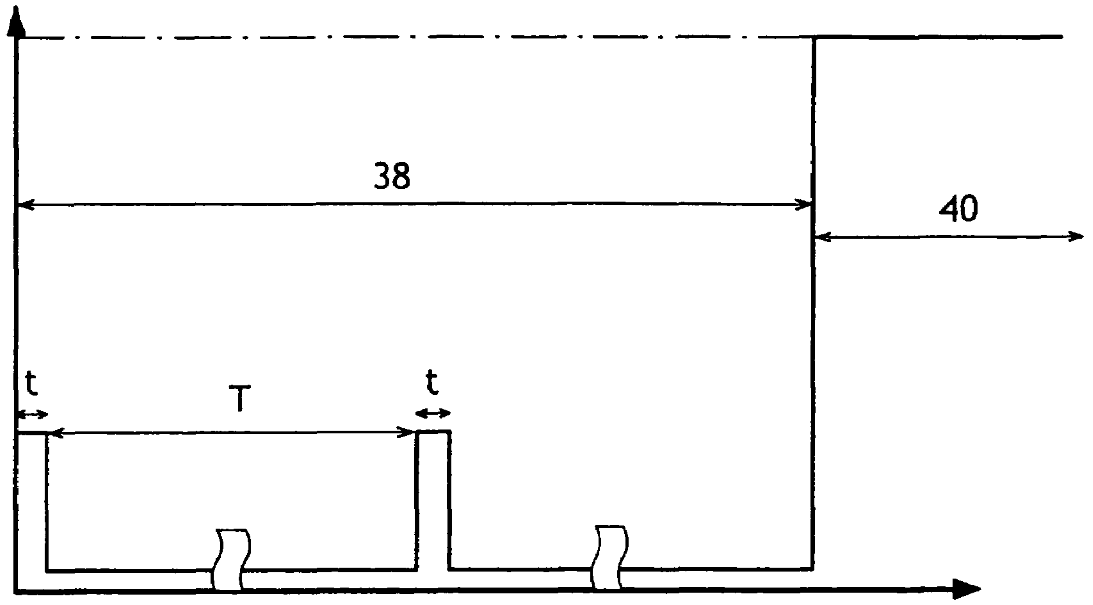
FIG. 3 shows the current consumption of the sensor.
Figure 4:
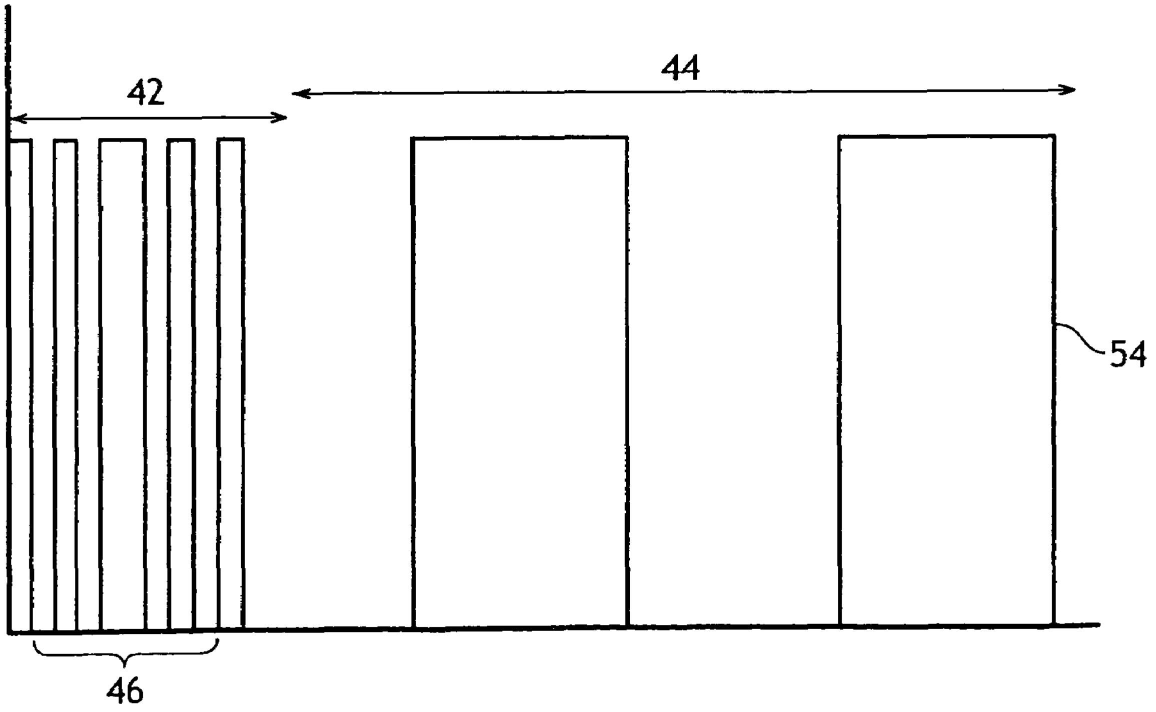
FIG. 4 shows signals transmitted by the sensor to the engine control unit.

As shown in FIG. 3, when the sensor 2 is in economic operating mode 38, the assembly 10 for detecting the displacement of the rotary part 8 is periodically supplied with power for a time t, which here is advantageously approximately 100 µs, and then is not supplied for a time T which here is advantageously approximately 10 ms. If the analysis unit 12 does not detect rotation of the crankshaft on the basis of the first signal 28, economic operating mode continues. If, on the other hand, a displacement of the crankshaft is detected, the analysis unit 12 puts the sensor 2 in normal operating mode 40, the assembly 10 for detecting the displacement of the rotary part 8 and the memory 14 then being permanently supplied with power, and the value of the memory 14 is read off, modified as a function of the detected displacement and transmitted to the internal counter. The analysis unit puts the sensor 2 in economic operating mode again after the given period of time during which no rotation of the crankshaft is detected on the basis of the first signal 28.

When the analysis unit 12 receives a given signal from the engine control unit 4, advantageously just before the engine is started, the analysis unit 12 transmits to the engine control unit 4, for a short period of time 42, the value 46 of the internal counter, which value is here framed by two parity bits. In order to count the 116 positions of the plates (58 teeth over two turns), the counter here comprises 7 bits.

During operation 44 of the internal combustion engine, the analysis unit 12 transmits to the engine control unit 4 a rectangular pulse 54 (having two values alternately) which corresponds substantially to the signal 28 or to the signal 30 received from the signal processing circuit 26, each descending front of the rectangular pulse 54 representing one displacement increment of the crankshaft detected by the assembly 10 for detecting the displacement of the rotary part 8. The engine control unit 4 accordingly always knows the precise position of the engine before it acts on the operating members of said engine.

If the analysis unit 12 detects a break in the power supply, when it receives the given signal from the unit 4, instead of transmitting the value to the counter it transmits a defined signal to that effect (for example the value 116 or the value 117 in binary) to the engine control unit 4 in order to carry out a prior initialisation procedure.

Advantageously, the memory 14 is of the read-only type, so that it does not consume current when the sensor is in economic operating mode. However, it would likewise be possible to provide a memory of the low-consumption read-write type, which would be supplied with power permanently.

Figure 5:
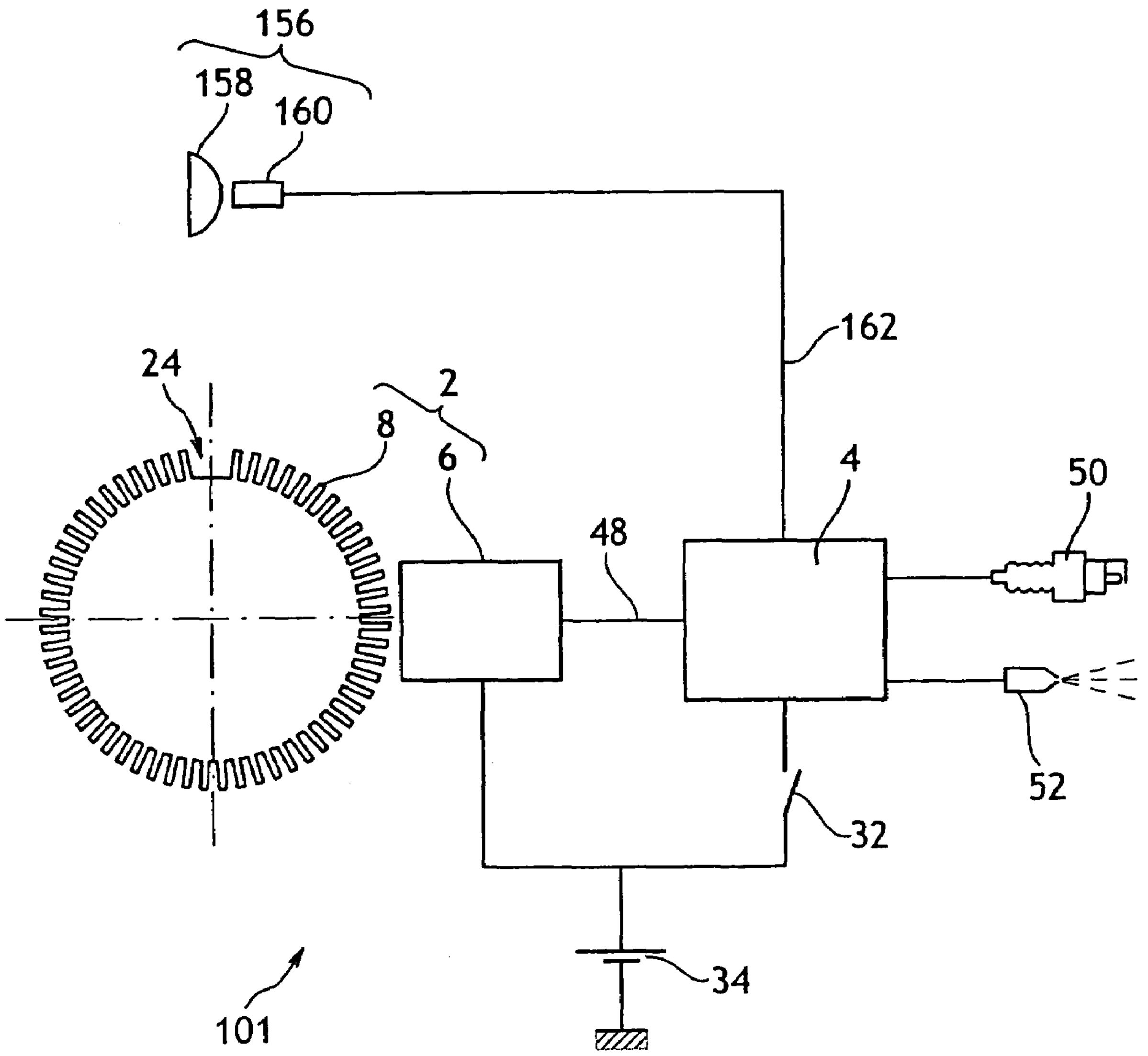
FIG. 5 shows a variant of the device of FIG. 1.

FIG. 5 shows a device 101. The device 101 differs from the device 1 shown in FIGS. 1 to 4 in that it further comprises an angular position sensor 156 having a movable part 158, which is connected to the camshaft of the engine, and a fixed part 160, such as a Hall-effect probe, which is arranged opposite the movable part. Because the other elements are unchanged, their reference numerals have been retained.

The angular position sensor 156 is connected to the engine control unit 4. Because the movable part 158 is half-moon shaped, the angular position sensor 156 generates a binary signal 162 which has a first value when the camshaft occupies a position between 0° and 180° and a second value when the camshaft occupies a position between 180° and 360°.

In that manner, by combining the position of the crankshaft every 360° as determined by the incremental-type sensor 2 and the binary value 162 generated by the angular position sensor 156 mounted on the camshaft, the engine control unit 4 knows the position of the engine every 720° of the camshaft. The internal counter is therefore re-initialised (for example reset to zero) each time the crankshaft passes the reference position.

The invention claimed is:

1. A device (1, 101) for determining the position of an internal combustion engine with a rotary member, the device comprising:

an incremental-type sensor (2) having a rotary movable part (8), connected to the rotary member, and a fixed part (6), the fixed part (6) comprising first means (16, 18, 20, 26) for detecting a reference position (24) of the rotary member and detecting a relative rotation of the movable part (8) and the fixed part (6) by an increment, said first means generating a first signal (28), second means (16, 22, 26) for detecting a relative direction of rotation of the movable part (8) and the fixed part (6), generating a second signal (30), and analysis means (12) connected to the first means and to the second means, for determining an angular position of the rotary member relative to the reference position, on the basis of the first signal (28) and the second signal (30), and generating a third signal (42) as a function of said angular position of the rotary member; and engine control means (4) connected to the analysis means (12) of the sensor (2), wherein, said engine control means (4) is configured to operate in i) rest state, in which said engine control means are not supplied with power by a source (34), and ii) a live operating state during which said engine control means is supplied with power from the power source (34) and generates actions on operating members of the engine as a function of the third signal, and the sensor (2) is supplied with power by the power source (34) regardless of whether the engine control means (4) operates in either of the rest state or the live operating state.

2. The device according to claim 1, wherein the sensor is configured to operate in an economic operating mode (38) which comprises, in succession and at regular intervals, i)a phase of activity (t) during which the first means and the second means are supplied with power, and ii) a phase of inactivity (T) during which the first means (16, 18, 20, 26) and the second means (16, 20, 26) are not supplied with power, and a normal operating mode (40), during which the first means and the second means are supplied with power continuously.

3. The device according to claim 2, wherein a duration of the phase of inactivity (T) of the phase of inactivity is at least 10 times longer than a duration of the phase of activity (t) of the phase of activity in which the sensor (2) operates in the economic operating mode.

4. The device according to claim 2, wherein a combined duration of the phase of activity (t) and the phase of inactivity (T) is less than 1 second.

5. The device according to claim 2, wherein the engine control means (4) are not supplied with power when the sensor (2) operates in the economic operating mode (38).

6. The device according to claim 1, wherein the analysis means (12) is configured not to generate the third signal (42) until the analysis means (12) receive a fourth signal emitted by the engine control means (4).

7. The device according to claim 6, wherein the analysis means (12) additionally is configured to transmit to the engine control means (4) a signal (54) corresponding substantially to the first signal (28).

8. The device according to claim 1, wherein,
the first signal comprises at least two levels,
the sensor further comprises a counter which is one of increased and decreased by an increment at each change of level of the first signal according to the direction of rotation detected by the second means, and
the counter is reset to a given value after detection by the first means (16, 18, 20, 26) of the reference position (24) of the rotary member.

9. The device according to claim 8, wherein,
the rotary member is constituted by a crankshaft of the engine,
the counter is reset to the given value only one time out of two after detection by the first means (16, 18, 20, 26) of the reference position (24) of the crankshaft.

10. The device according to claim 8, wherein,
the rotary member is constituted by a crankshaft of the engine,
the device further comprises an angular position sensor (156), located on a camshaft of the engine, the angular position sensor (156) configured to generate a binary signal (162).

11. The device according to claim 3, wherein a combined duration of the phase of activity (t) and of the consecutive phase of inactivity (T) is less than 1 second.

12. The device according to claim 1, wherein said operating members of the engine include any of fuel injectors (50) and spark plugs (52).

13. The device according to claim 1, wherein the analysis means (12) is supplied with power independently of the engine control means (4) and follows the angular position of the rotary member relative to the reference position regardless of whether the engine control means (4) operates in either of the rest state or the live operating state.

14. The device according to claim 8, wherein the fixed part (6) further comprises a memory (14) connected to the analysis means (12), the analysis means (12) being configured to store the value of the counter in the memory (14), and the memory (14) configured to retain the stored value regardless of whether the engine control means (4) operates in either of the rest state or the live operating state.

15. The device according to claim 14, wherein the analysis means (12) is further configured to, upon the sensor being in an economic operating mode and upon detection of a rotation of the crankshaft, place the sensor (2) in a normal operating mode, reading the value from the memory (14), modifying the value as a function of the detected rotation, and transmitting the value to the internal counter.

16. The device according to claim 13,
wherein the rotary member is fitted to a crankshaft of the engine, and
wherein the position of the crankshaft is accurately known by the analysis means (12) at any time, including after a prolonged stoppage of the engine.

17. A device (1, 101) for determining the position of an internal combustion engine, the device comprising:
an engine control, unit (4) configured. to generate actions on operating members of the engine; and
an incremental-type sensor (2), having a movable rotary part (8) fitted to a crankshaft of the engine and having a fixed part (6) configured to detect displacements of the rotary part (8), the sensor connected to the engine control unit (4),
the fixed part (6) comprising
first means (.16, 18, 20, 26) for detecting a reference position (24) of the rotary member and detecting a relative rotation of the movable part (8) and the fixed part (6) by an increment, said first means generating a first signal (28),
second means (16, 22, 26) for detecting a relative direction of rotation of the movable part (8) and the fixed part (6), generating a second signal (30),
an analysis unit (12), and
a memory (14),
wherein the analysis unit (12) is configured to process the first signal (28) and the second signal (30), determine an angular position of the crankshaft relative to the reference position (24), and determine a direction of rotation of the crankshaft,
wherein the analysis unit (12) is configured to transmit the angular position of the crankshaft to the engine control unit (4),
wherein the engine control unit (4) and the sensor (2) are each connected to a. power source (34) of the engine,
wherein the sensor (2) is supplied with power from the power source (34) of the engine regardless of whether the engine is running, the sensor configured to detect a displacement of the crankshaft regardless of whether the engine is running, and
wherein the analysis unit (12) of the sensor (2) is configured to store an information based on the first signal and the second signal to the memory (14) such that the angular position of the crankshaft is known accurately at any time, even after a prolonged stoppage of the engine.

* * * * *